United States Patent [19]
Maholick et al.
[11] 3,735,357
[45] May 22, 1973

[54] PRIORITY SYSTEM FOR A COMMUNICATION CONTROL UNIT

[75] Inventors: Andrew Walter Maholick, Raleigh; Frank Allen Newlin, III, Cary; Ramon Eugene Snyder; Stanley Ray Stager, III, both of Raleigh, all of N.C.

[73] Assignee: International Business Machines Corporation, Armonk, N.Y.

[22] Filed: Sept. 19, 1972

[21] Appl. No.: 290,429

Related U.S. Application Data

[63] Continuation-in-part of Ser. No. 73,485, Sept. 18, 1970, abandoned.

[52] U.S. Cl. ....................340/172.5
[51] Int. Cl. ....................G06f 9/18
[58] Field of Search ....................340/172.5

[56] References Cited

UNITED STATES PATENTS

| | | | |
|---|---|---|---|
| 3,543,242 | 11/1970 | Adams, Jr. et al. | 340/172.5 |
| 3,611,305 | 10/1971 | Greenspan et al. | 340/172.5 |
| 3,587,054 | 6/1971 | Byrne et al. | 340/172.5 |
| 3,599,158 | 8/1971 | Noren et al. | 340/172.5 |
| 3,599,162 | 8/1971 | Byrne et al. | 340/172.5 |
| 3,453,600 | 7/1969 | Stafford et al. | 340/172.5 |
| 3,473,155 | 10/1969 | Couleur et al. | 340/172.5 |
| 3,399,384 | 8/1968 | Crockett et al. | 340/172.5 |

*Primary Examiner*—Paul J. Henon
*Assistant Examiner*—Paul R. Woods
*Attorney*—Delbert C. Thomas, Dewey J. Cunningham et al.

[57] ABSTRACT

A priority system is described for a communications controller having a large number of attached communication lines. The communication lines are divided into groups of lines having substantially the same service requirements. All lines within a higher priority group will be given service before any service is granted to lines having a lower priority. Within each group, service will generally be accorded to the lines on a first come, first served priority scheme.

4 Claims, 7 Drawing Figures

LOCAL STORAGE REGISTERS
41

PRIORITY SYSTEM FOR A COMMUNICATION CONTROL UNIT

This application is a continuation-in-part of our application Ser. No. 73,485 filed by us on Sept. 18, 1970 and now abandoned.

OBJECTS OF THE INVENTION

This invention relates to a multiplexor for communication lines and more particularly to a priority system for ensuring that data is processed in order of its priority.

The allocation of priorities to input-output devices attached to processing systems has previously been done on a time basis where devices are serviced in the same order as they request service or has been done on a device priority basis where each device has its own priority and will be serviced before any device of a lower priority. The time basis is not satisfactory when the devices are of mixed characteristics and some can wait for service while others cannot be delayed. The device priority basis is unsatisfactory for large numbers of devices where a low priority device can be shut out by higher priority devices of a similar type and is also unsatisfactory in that the priority circuits become overly complicated.

The present invention provides a combination of the two priority schemes by classifying the I/O devices of a system into groups of devices, each group having substantially similar priority requirements and by giving each group a priority according to its needs. Within a group, priority will be assigned on a time basis with the first ready device being serviced when its group has the highest priority of the groups needing service. An address register is provided for each group of I/O devices and when a device is found to require service, its address is stored in its group register and a service request signal is set to interrupt the processor. The processor will then scan all of the address registers and will provide service in order of priority to the devices whose addresses are stored. The address registers are rescanned each time a device is serviced so that if a high priority device asks for service while a lower priority device is being serviced, its request will be taken up as soon as the action for the lower priority device is completed even though one or more other low priority devices have been waiting longer.

It is then one object of this invention to provide a priority servicing system for a processing unit having connected thereto a plurality of I/O devices of different characteristics and arranged in groups having similar characteristics. The priority system is designed to service the groups in the order of their relative requirements, but to provide service within a group on a first come, first served basis.

It is another object of the invention to provide a scanning mechanism for a central processing unit to provide periodic scanning of groups of devices, each group having devices of similar character and to apply servicing priorities to each group relative to the other groups but not to the devices within a group.

A further object is to provide a relatively simple I/O device servicing system for a central processor having a large number of connected devices of differing characteristics and in which priority of service is by groups of similar character but each device within a group is serviced in the order in which it requests service.

The foregoing and other objects, features, and advantages of the invention will be apparent from the following more particular description of a preferred embodiment of the invention as illustrated in the accompanying drawings.

DRAWINGS

DESCRIPTION OF PREFERRED EMBODIMENT

The invention is described hereinafter as a part of an intelligent multiplexor for communication lines. The multiplexor is capable of handling a wide variety of terminals and communication facilities at a number of line speeds to provide a high degree of configuration flexibility. The usual functions of character assembly/disassembly, line control character handling, generation of check characters, etc., can be supplemented by additional housekeeping tasks such as message assembly, line scheduling, network control, error recovery procedures, and message processing to significantly reduce the work load on the main system processor.

PREFERRED EMBODIMENT

Figure 1:
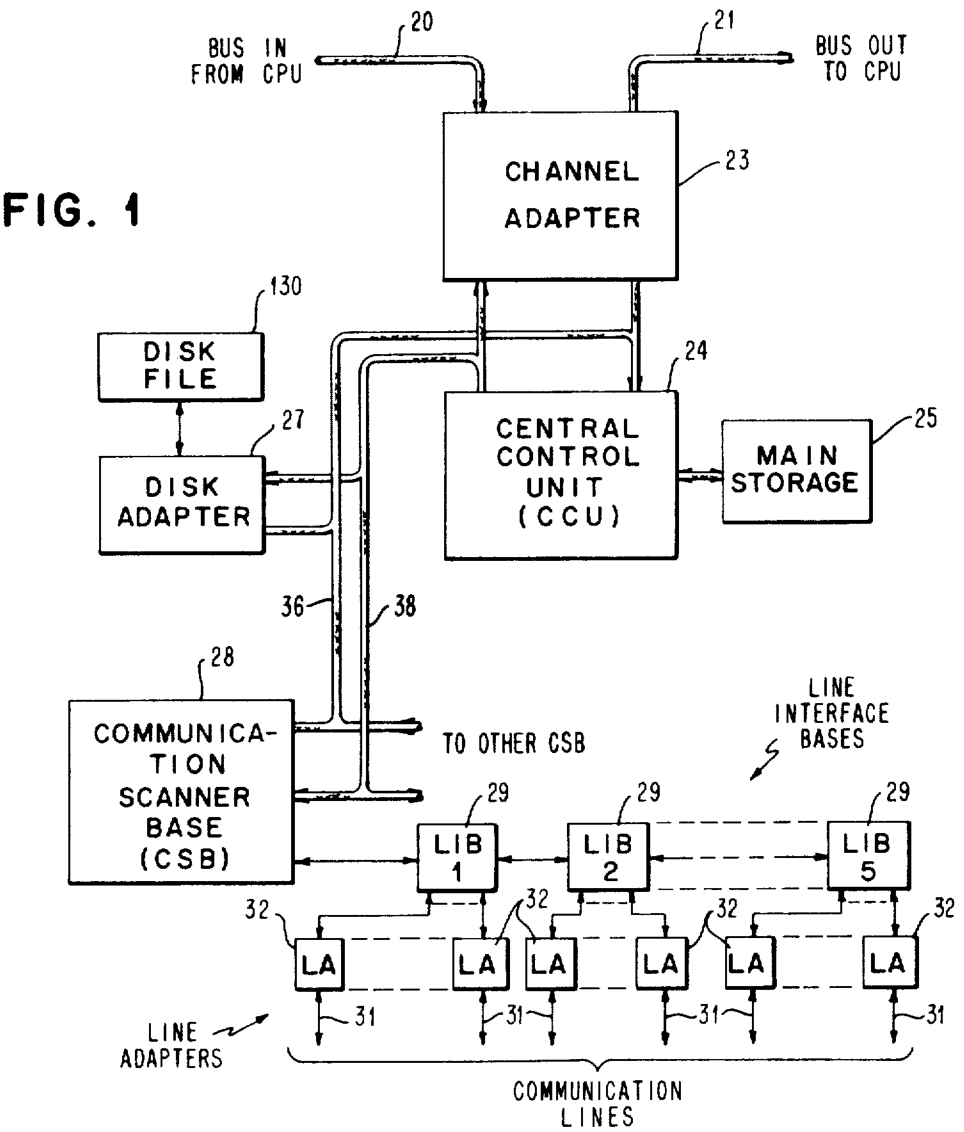
FIG. 1 is a diagrammatic showing of a communication controller for servicing a large number of communication lines.

The preferred embodiment of the multiplexor is as shown in FIG. 1. The multiplexor is attached to one channel of a host central processing unit (CPU)such as one of the models of the System 360 or System 370 processors made commercially available by the assignee of the invention. Embodiments of these CPU's are described in U.S. Pat. No. 3,477,063 issued Nov. 4, 1969 to D. W. Anderson et al, together with the cross references cited therein and in U.S. Pat. No. 3,400,371 issued Sept. 3, 1968 to G. M. Amdahl et al. Data is transmitted from and to the CPU by a Bus In 20 and a Bus Out 21 which connect to a channel adapter section 23. The channel adapter 23, one type of which is shown in U.S. Pat. No. 3,488,633 issued on Jan. 6, 1970 to L. E. King et al, or to the simpler types commercially available for connecting input-output equipment to the System 360 or System 370 channels, responds to all of the control signals on the channel busses and appears as a single control unit using a single channel address. All information to and from the CPU channel through adapter 23 is monitored by a central control unit (CCU) 24 which contains the circuits and data flow paths to control main storage 25, local storage registers 41, FIG. 2, channel adapter 23, and a disk adapter 27. The CCU 24 operates, as will be later set out, under control of conventional program routines stored in main storage 25 to implement the multiplexor functions. One or more communication scanner bases (CSB) 28 are attached to the CCU 24 to each scan up to five line interface bases 29, each of which bases can provide service for a group of communication lines 31 through the conventional modems or line adapters 32. The primary function of the CSB 28 is to periodically scan the hardware in the line interface bases 29 for service requests. The CSB 28 automatically assembles and disassembles characters by fetching and storing interface control words from and into main storage 25 under a direct memory access ("cycle stealing") control mechanism.

CENTRAL CONTROL UNIT

Figure 2:
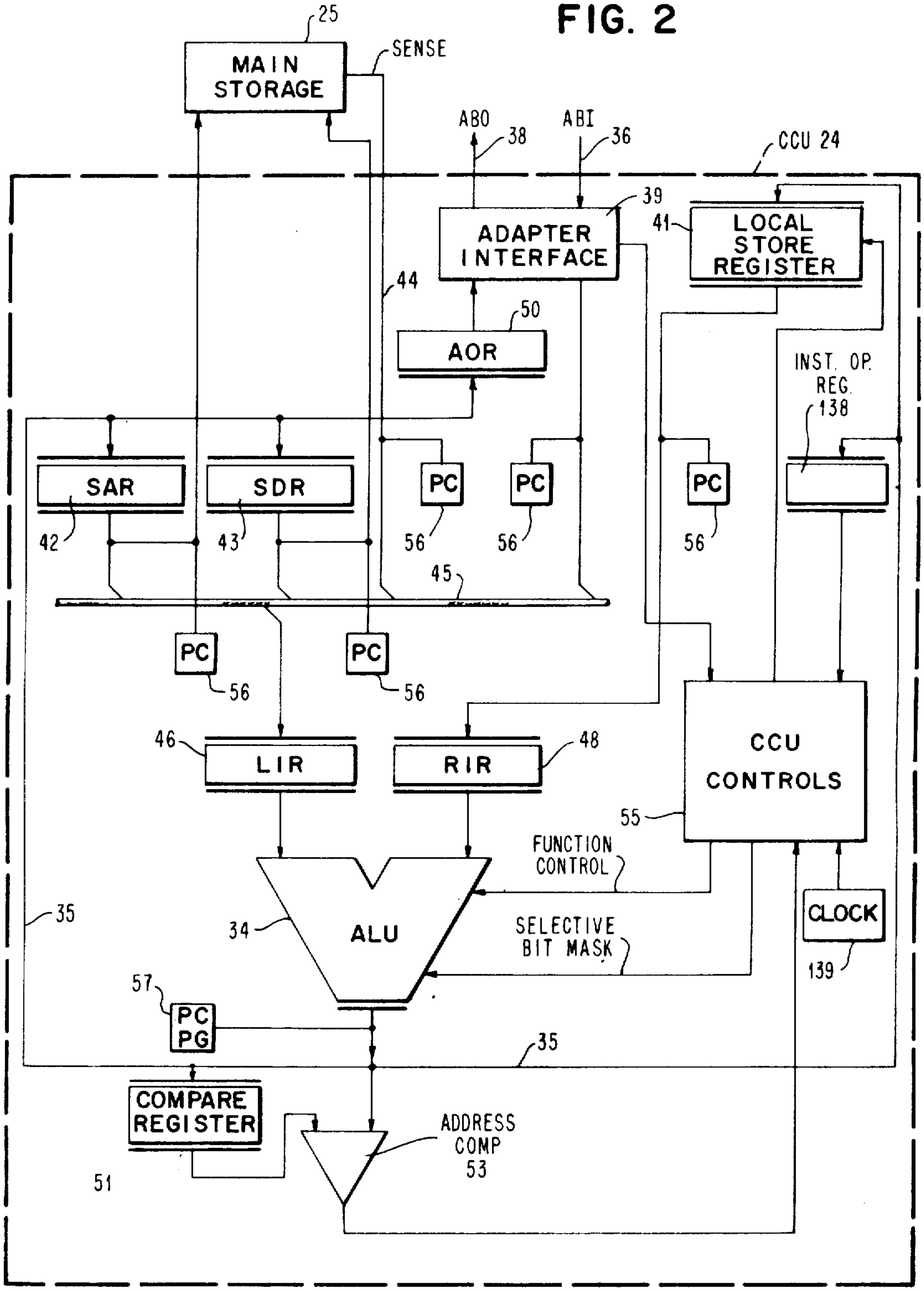
FIG. 2 is a schematic diagram of the central communication unit for the system of FIG. 1.

A more detailed showing of the CCU 24 is presented in FIG. 2. In the CCU 24, the data path comprises hardware registers, local store registers, data busses and an arithmetic logic unit (ALU) 34. Data moves from one register to another over a common data bus 35 after passing through ALU 34, and all adapters share a common data input bus (ABI) 36 and a common data output bus (ABO) 38. An adapter interface 39 provides control signals to transfer data and control information to the adapter busses 36 and 38. The registers used herein for the preferred embodiment are of the conventional type having a two state circuit for each bit position for which data is to be stored. Each bit position has one or more gated circuits to set the two state circuit in accordance with an incoming data line and gates to connect the state indicating output of the bit positions of the register to the data output lines.

There are two storages available to the CCU 24, one storage being the main storage 25 of a conventional type which contains all of the program instructions for system operation and the other being a small local store 41 of high speed transistor registers. The main storage 25 is controlled by two registers, the storage address register (SAR) 42 for selecting a storage address and the storage data register (SDR) 43 which holds a data word to be placed in the selected address area. Words read out from main storage 25 over SENSE line 44 are placed on a bus 45 which can also receive data from SAR 42, SDR 43 and the adapter interface 39. Data on bus 45 can be gated for buffering in the left input register (LIR) 46 of the ALU 34. The data from any selected one of the local store registers 41 is buffered in the right input register (RIR) 48. An adapter output register (AOR) 50 connected to bus 35 will buffer data to be transmitted on ABO 38 while a compare register 51, also connectable to bus 35 can store an address for later comparison in address comparator 53 with an address generated in ALU 34.

The CCU 24 has its functions controlled by a control section 55 which, for the operations to be performed, controls functions of the ALU 34, controls the effectiveness of the gates to the output bus 35, to the input bus 45, and controls the selection of registers 42, 43, 46, 48, and 50 to transfer data over the desired paths.

This control section 55 which is timed by a clock 139 operates to decode instructions received from the main storage 25 and to set the latches and data gates throughout the CCU 24 and operates in the normal manner, e.g., during a first part of a cycle, an instruction from the main storage is loaded into instruction operation register 138 and in the later part of the cycle, the instruction is decoded and used to perform a required function. The CCU controls 55 will then recycle to similarly transfer the next instruction into register 138 etc. As will be later pointed out, branching between instructions is included and this will enable the use of several levels of programming interruptions and "cycle steal" requests as is now well known in the art. Data movement is checked on each input and output path to busses 35 and 45 by conventional parity checkers (PC) 56 or by a checker 57 on the output of ALU 34 which can check an existing parity or can generate parity for a factor developed in the ALU 34.

COMMUNICATIONS SCANNER BASE

Figure 3:
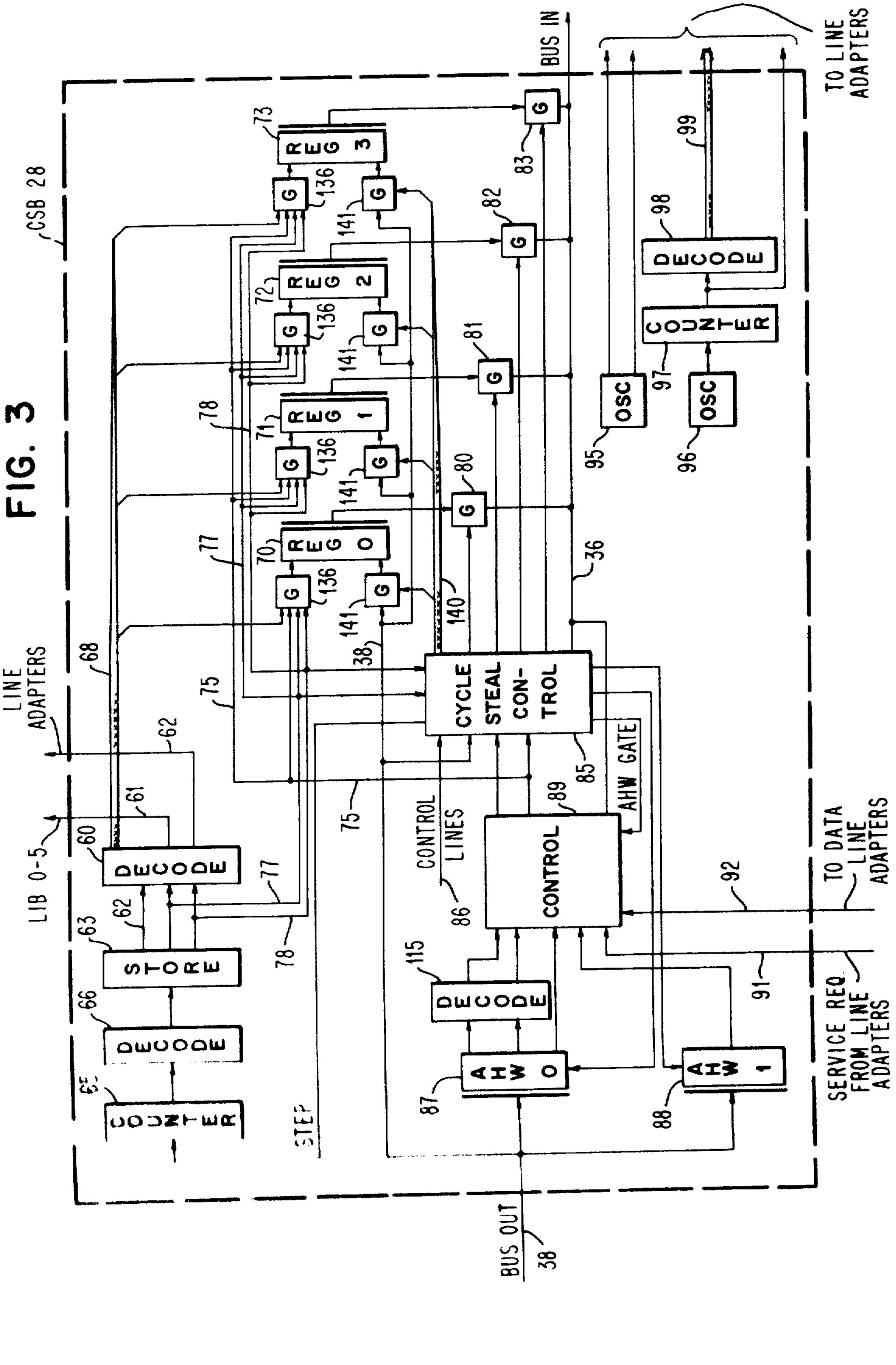
FIG. 3 is a layout of the communication scanner base for the system.

The CSB 28 is diagrammed in FIG. 3 in more detail. The CSB 28 scans all of the connected communications lines 31 for service requests. The scanning is done by a decoder 60 which transmits on a bus 61 the identity of an LIB 29 and on a bus 62, the identity of the communication line position of the selected LIB 29 to be scanned. The decoder 60 is given the full communication line address by a storage 63 which stores a variable table having the desired scanning sequence, higher speed lines being scanned oftener than those of slower speed. A clock driven counter 65 and an address decoder 66 address the table entries sequentially. Storage 63 also contains a group priority number in each table entry and this number is decoded to activate one of a group of lines 68 for selecting a priority register. There are four priority registers 70, 71, 72, and 73, one for each priority level of the group priority numbers. When, as will be later described in more detail, the CSB 28 during the scanning and processing of one of the communications lines 31 decodes a line status which cannot be handled in CSB 28 and requires some processing in the more versatile CCU 24, it brings up the signal level on a line 75 to open the gate 136 selected by the energized one of the lines 68 to thereby activate the priority register 70, 71, 72, or 73, to receive from lines 77 and 78 on the output of storage 63 the address of the communications line 31 being scanned. Each register 70, 71, 72, or 73 has a gate 80, 81, 82, or 83 on its output to pass the address in a selected register to bus-in 36 for transmission to adapter interface 39 of CCU 24, FIG. 2. A cycle steal control 85 can pass the address on lines 77 and 78 to bus-in 36 when normal processing in CCU 24 is to be halted momentarily so that a selected communication line can be given CCU service. Effectively this is a high priority level interrupt of the program operating in CCU 24 and provides for immediate bit service in the CCU 24 for the CSB 28 requirements.

Bus-out 38 from CCU 24 is the main data input circuit to CSB 28. The CSB may have its input data gated into either the adapter half word register 0 (AHWO) 87 or the adapter half word register 1 (AHW1) 88. Gating is controlled by the CSB control circuits 85 and 89, which are responsive to service requests on an input 91 to pass data over circuits 92 to the line adapters 32. The function of these controls will be described in conjunction with the operations of CCU 24 at a later point. The CSB 28 also contains four different speed oscillators 95, which have their outputs sent to the line adapters 32 to control their timing and also has an oscillator 96 with a counter 97 and a decoder 98 to provide timing and control signals on a buss 99 to the LIB's 29.

LINE INTERFACE BASE

Figure 4:
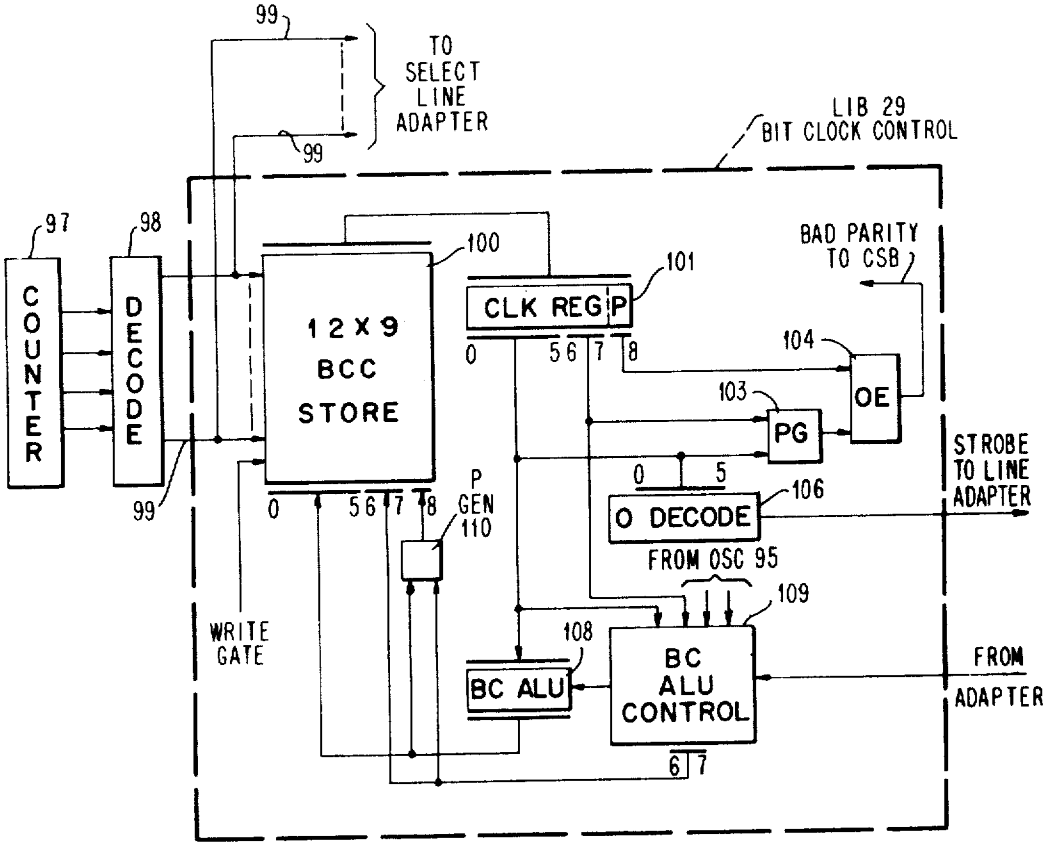
FIG. 4 is a diagram of one of the line interface bases attached to the base of FIG. 3.
Figure 4A:
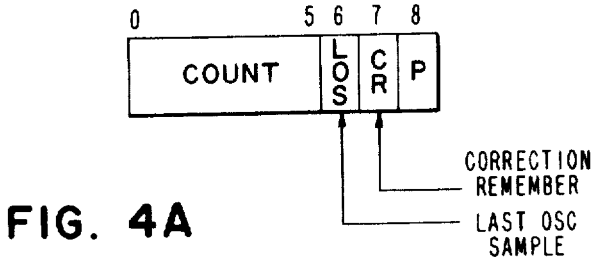
FIG. 4A is a representation of one of the line control words utilized in the line interface base of FIG. 4.

Each of the LIB's 29 is substantially the same and is as diagrammed in FIG. 4. The LIB 29 has driving and gating circuits for distributing signals from the CSB 28 to each attached line adapter 32 and for terminating, ORing, and redriving all signals from the line adapters 32 to the CSB 28; but as these are conventional circuits, they are not further described herein. The LIB 29 also has a common bit clock control (BCC) for all attached lines. The BCC has a storage 100 to hold a control word for each attached line, here assumed to be limited to not more than 12 lines, and is sequentially readout by addresses on the bus 99 from counter 97 and decoder 98 in its associated CSB 28. At the same time the CSB 28 accesses a word from the BCC store 100, the associated line interface 32 is also selected over bus 99. Each word in storage 100 is 9 bits wide as indicated in FIG. 4A and comprises six count bits, a last oscillator sample bit and a correction remember bit. The remaining bit is a parity bit for error checking.

As a word is read from store 100, it is buffered in a clock register 101 where a parity generator 103 determines the parity of the data bits and this parity is compared in an Exclusive OR 104 with the stored parity bit in register 101 to insure that the storage has not misoperated. The count portion of the word is also interpreted in the 0 decoder 106 to send a strobe signal to the line adapter 32 whose control word is being scanned if the count is zero. The count in the control word will be decremented by a unit in a bit count arithmetic unit BC ALU 108 under control of a BC ALU control 109. Control 109 receives from the adapter 32 the signals indicating what type of terminal is being scanned and an identification of the correct oscillator signal to be used from the oscillators 95 in CSB 28. The control 109 thereby selects the correct clock signal and compares its state with the LOS bit in the control word in register 101 to determine if the oscillator state has changed and the count should be decremented. As is usual in telecommunication systems, the count field in bits 0–5 will be reset in BC ALU 108 to a mid count whenever a transition on a start-stop line is detected by a line adapter 32 and can be advanced or retarded by one or a few counts if a line transition occurs on a synchronous type line at some count other than a half bit period after the last strobe signal. The CR bit 7 of the control word is set by control 109 when such a correction is made to prevent two corrections in the same bit strobing period and will be reset when the count section reaches a zero. The updated control word count from the BC ALU 108 is returned to the same address in store 100 from which it was read out and its parity is stored from a parity generator 110 receiving the first eight bits of the control word.

OPERATION

The full operating sequences of the preferred embodiment of this invention are set out in the publication "IBM Communications Controller, Principles of Operation," more particularly in Chapter 4. The publication is available through IBM Corporation, Data Processing Division, 1133 Westchester Ave., White Plains, N. Y. 10604 and will therefore be only set out herein to the extent needed for an understanding of the invention. At the simplest level of the system, i.e., the LIB-Adapter level, the oscillator 96 in CSB 28 operates continuously to cause decoder 98 in FIG. 4 to sequentially select one stored address word in BCC store 100 and its associated line interface in each LIB 29. The line interface at a connected line adapter will return to the BC ALU control 109, signals indicating whether the line is receiving its clock signals from the adapter or should use a CSB internal clock, whether it is a synchronous or start-stop type of transmission, whether the line has made a recent signal transition, and the identification of the oscillator 95 to be used for clocking. If the line is in a transmit state the count section of the read out control word will be decremented whenever the present state of the selected oscillator signal does not correspond to the stored bit 6 of the control word. On the next read out of the word after the count is decremented to zero, a strobe signal is sent from detector 106 to gate the bit to be transmitted into the output buffer of the line adapter 32 for the selected line.

If the line is a start-stop line in the receive state, the control word will be recycled and decremented on each cycle of its oscillator 95. This will result in a strobe cycle at each bit time interval and even though the control words in CSB 28 indicate that no data is being received, the signals are useful in monitoring the operation of the LIB 29. The first transition of the line signal will be acted on by control 109 to set through BC ALU 108, the count section of the control word (FIG. 4A) to the middle of its normal count setting so that the LIB will, as is conventional in the art, thereafter strobe the input signal at the center of a bit signal period.

When the line is operating in a synchronous mode, the LIB 29 will continue to strobe the line as indicated above but the bit clock control will make the conventional corrections to the count field of the control word from memory 100 at each transition of the data signal. The high order bits of the count field are examined and if the transition has occurred near but not at the center of a strobe pulse period, an additional decrement correction is made to or a decrement is withheld from the count to bring the count closer to or slightly past the center of the count range or if the count is substantially different from the center value, a larger correction is made to the count to bring it closer to the middle value. In this mode, when a correction is made, the correction remember bit number 7 of the control word is set to prevent another correction cycle if a further transition due to noise or an erroneous signal should be detected on the line. The correction remember bit is reset by control 109 when the count field reaches zero and a strobe signal is issued.

The sequencing and bit counting cycles as set out above continue without interference with the operations proceeding in the CCU 24 which can be continuing with any data processing operations for which it is programmed. The lowest level of operation of the CSB 28 at which it interacts with the CCU 24 arises when a bit is strobed in a line adapter 32 and the strobed bit is detected by control 89 as a signal on line 91 when the adapter 32 is scanned. The strobe signal from LIB 29, when received at the line adapter 32, has, as is conventional in the art, set the state of the transmission line into an input buffer and has brought up the voltage on an interface line to indicate that it wants to receive service. The same line will be brought up if the line adapter is transmitting and needs to receive a bit to be buffered until the next strobe pulse puts it on the line. The separate service request lines of the line adapters 32 are gated during the scanning sequence by the address lines 61 and 62 of CSB 28 to a common service request line 91, see FIG. 3. A signal on service request line 91 will be detected in control 89 to activate the cycle steal controls 85 for two machine cycles to prevent further stepping of counter 65 and thereby hold up the scanning of the sequence of line adapters until the adapter requesting service is serviced. The cycle steal control 85 will place the address of the line adapter 32 which is requesting service, on bus 36 to the CCU 24. This will cause the CCU 24 to stop its program and in a first cycle to supply to bus 38 from memory 25 a half word AHW O specific to the address of the scanned line. The half word is 16 bits long and it will be stored in register 87. It contains both a designation of the type of data being transferred through the scanned line adapter 32 and for data transmissions the remaining bits of a character being sent or for data reception, the bits so far received of the data character. The designation of the type of line control is decoded in a decoder 115 and is sent to control 89 where it is used to modify the data portion of the word as required. One bit will be accepted from the line adapter 32 on line 72 and added to the adapter half word when data is being received or one bit will be sent to the adapter 32 over line 92 and will be removed from the half word during data transmissions. This will reset the line adapters service request signal to release control 89 for a second machine cycle. The modified word in register 87 transmitted during the second machine cycle back to the CCU 24 over bus 36 and is returned to its address in main storage 25 since the address on bus in 25 has not changed during these cycles. The control 89 and cycle steal control 85 thereafter release counter 65 to continue counting to select the line adapters 32 by means of the line address in store 63.

The control 89 can determine when assembly/disassembly of the character stored in AHWO register 87 has been completed and it will then perform an additional cycle stealing operation to prepare for character service by CCU 24. When a character service operation is needed for a line adapter, cycle steal control 85 is reactivated by control 89 and then requests from main storage 25 AHW 1 which is the second half of the line control word, AHW 1 is transmitted to the CSB 28 over bus 38 and stored in AHW 1 register 88. A character will be transferred from the character part of AHW 0 register 87 to the character buffer part of AHW 1 register 88 or vice versa depending on whether the data is being received from or transmitted to a line adapter. The data from both registers 87 and 88 will then be returned over bus 36 to their addresses in main storage 25 in separate cycles. During these cycles, the address of the line adapter 32 which has thereby been detected as needing character service to unload or to reload the character buffer part of AHW 1 will be gated through the gate 136 and buffered in the one of the priority registers 70, 71, 72, or 73 then selected by the activated line of bus 68. Such buffering causes a character service request to be sent over a line of bus 36 to CCU 24. The CSB 28 is then released by control 89 to continue to scan the line adapters 32 and perform bit service as required. If character service is required for another line adapter 32 before the pending character service request is processed by CCU 24, the address of the second line needing service will be gated into the register 70, 71, 72, or 73 assigned to its priority group if the register is not already occupied. If there is already a line adapter of its group requesting service, a conventional Interrupt-Request latch is set in the line adapter. As soon as the line adapter is scanned after the corresponding priority register 70, 71, 72, or 73 has been cleared of a prior address, the register 70, 71, 72, or 73 for the adapter will be reset to the address of the next adapter found to be requiring service.

PRIORITY INTERRUPTS

The interrupt facility of the controls 55 of CCU 24 is of the conventional type set out in U.S. Pat. No. 3,048,332 issued Aug. 7, 1962 to J. L. Brown et al and more particularly of the input/output control type of interrupt shown in U.S. Pat. No. 3,208,048 issued Sept. 21, 1965 to T. Kilburn et al. Both of these patents are assigned to the assignee of this application and each disclosure provides for hardware forced branches from lower priority control-routines to higher priority control-routines based on conditions in the data flow or in the I/O adapters. Examples of conditions which may cause interrupts are:

1. A timer interval has elapsed,
2. A machine check has been detected,
3. A character has been assembled for a line adapter, or
4. A character has been transmitted from a line adapter.

Interrupts are called for by the I/O adapters or by conditions in the data flow which signal an interrupt request to the interrupt control mechanism in CCU controls 55. Because of the large number and varying types of interrupt requests as indicated in Chapter 2 under the heading "Interrupts" in the above noted manual, they are grouped into four priority levels from level-1 having the highest priority to level-4 with the lowest priority. When an interrupt is called for at a given level, hardware in control 55 forces a program branch to an instruction in a fixed mainstorage address assigned to that level. This referenced instruction will be the start of a program to process the interrupting event.

Figure 5:
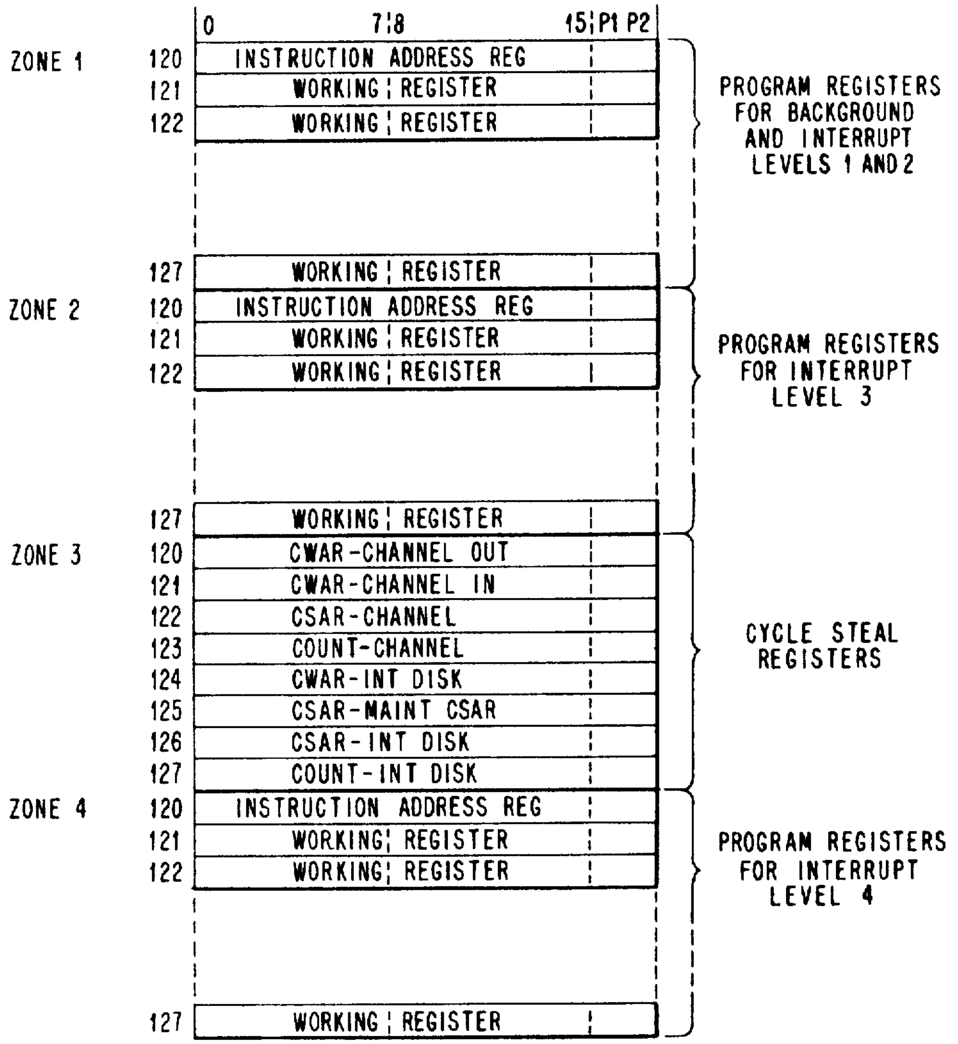
FIG. 5 is a listing of the assignment of the functions of the local store registers of FIG. 2.

The interrupt routines are controlled by the local store registers 41, FIG. 2. As indicated in FIG. 5, the local store registers are divided into four zones with each zone 1, 2 and 4 having an instruction address register 120 and seven working registers 121 through 127 inclusive. In zones 2 and 4, register 120 is always loaded with the address of the first instruction of the interrupt routine for the type of interrupt to be serviced and will be incremented at each program step in the routine. The background data processing and the unpredictable machine interrupts are processed using the registers of zone 1.

The registers of zone 3 are reserved for the addresses and counts used in cycle steal operations, supra, which are independent of and which temporarily halt the current program being executed. The cycle steal operation is to pass data between adapters and main storage using main storage read-write cycles. As shown, the channel control is allocated four registers, for use in its service programs, disk adapter 27 and its attached disk file 130 are allocated 3 registers for their programs and the last register is for use in maintenance cycle stealing programs.

A level-3 interrupt request is signalled to the CCU control section 55 through adapter interface 39, FIG. 2, if any of the CSB 28 priority registers 70, 71, 72 or 73 contains the address of a communication line requiring character service. When the next level-3 interrupt is permitted by the CCU operating program, an instruction, whose address is stored in the zone 2 register 120, causes the line address stored in the highest priority one of the occupied registers 70, 71, 72 and 73 to be passed into CCU 24 on bus-in 36. From there it passes through bus 45 to LIR 46 and through ALU 34 to bus 35 and then to local store 41 to be stored in a designated one of the program registers 121, 122, 123, 124, 125, 126, or 127 of the zone-2 local store registers. The instruction address in the zone-2 storage register 120 is incremented to continue the interrupt program which will utilize the data word contained in the loaded register 121, 122, 123, 124, 125, 126, or 127 as the address of the communication line whose stored data word AHW, is to be updated during the further processing of the interrupt.

Figure 6:
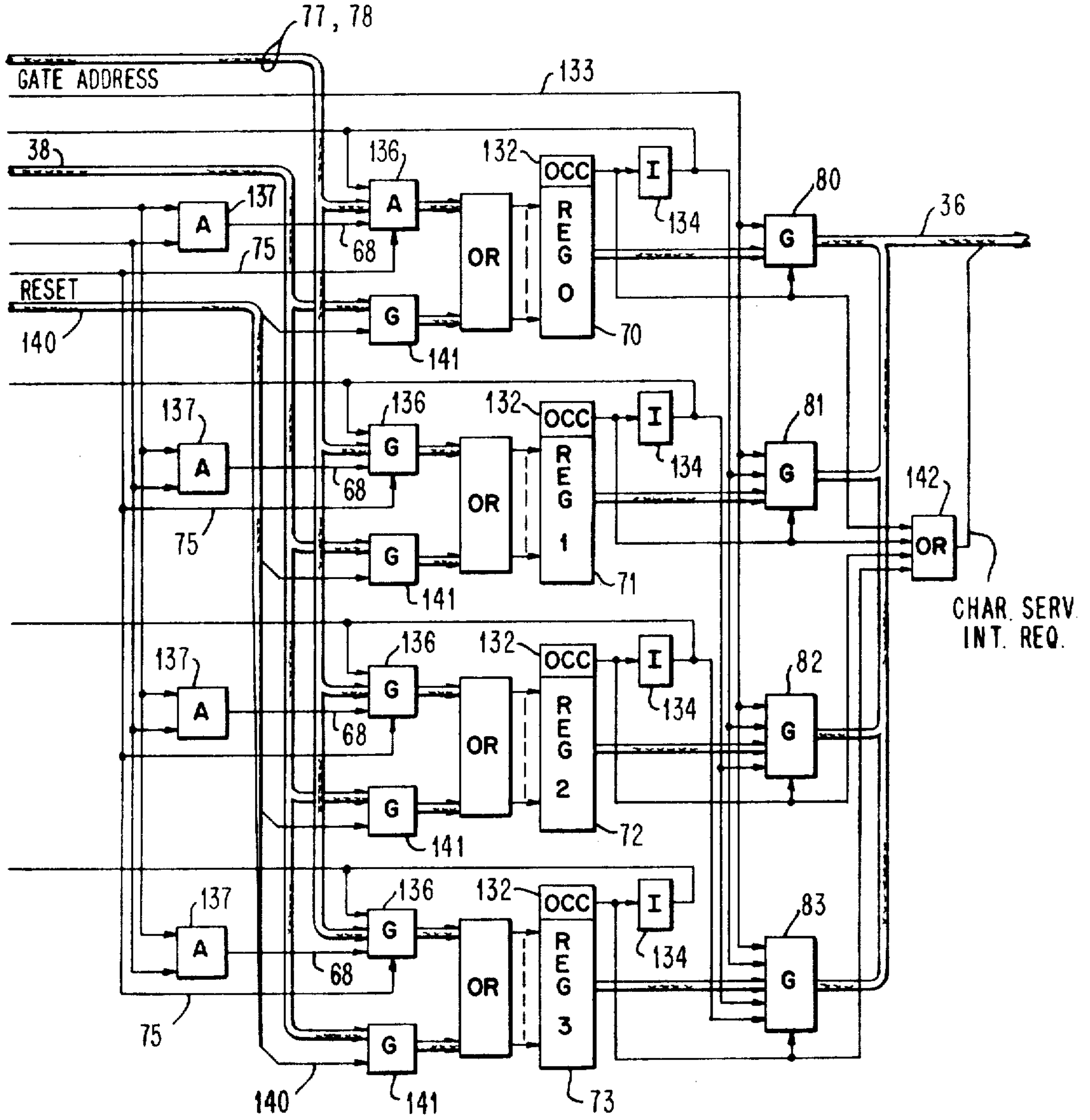
FIG. 6 is a diagram of the structure to provide priority between the character service request registers.

The hardware to select the occupied register 70, 71, 72, or 73 having the highest priority is shown in FIG. 6. Each of the registers 70, etc. has an indicator circuit 132 such as a conventional latch or trigger which can be set to give an output whenever a line address is stored in the register 70, etc. The output of each circuit 132 is an input to gates 80, 81, etc. between the associated register 70, 71, etc. and adapter bus 36. The outputs of all circuits 132 are combined in an OR circuit 142, see FIG. 6, whose output signal is passed to CCU 24 over bus 36. A common line input to all of the gates 80, 81, etc. is a gate address line 133 which is activated by the interrupt program instruction noted above to gate an address from a register 70, 71, etc. to bus-in 36. Only the occupied register having the highest priority will be gated out to bus 36 and this is enabled by an inhibiting control connection from each register to all of the gates 81, 82, etc. of the registers of lower priority. Each circuit 132 has an inverter 134 on its output and the inverted output signal is supplied to the gates 81, 82 of all lower priority registers to block the gate when the circuit 132 of a higher priority register is set to indicate that the register is occupied. Thus the application of a gating signal on line 133 will gate out only the data in the register of highest priority.

The registers 70, 71, etc. are set by input gates 136 between the address bus comprising lines 77 and 78 and the set inputs of the registers. Each group of gates 136 is selected by an AND circuit 137 forming a part of decoder 60, FIG. 2 which decodes the priority information on lines 68 to condition one group of the gates. Each gate 136 is also conditioned by a signal on line 75 which is set when a need for character service is detected by control 89, FIG. 3. Each register 70, 71, etc. has the output of its inverter 134 returned as an input to its gates 136 to prevent the entry of a second line address into an already occupied register. Resetting of a register 70, 71, etc. after its data has been sent out on bus 36 is performed under control of one of the instructions of the character service program. A reset instruction is sent over control lines 86 to cycle steal control 85 to interrupt CSB 28 scanning for one cycle. During the cycle, the priority address in the instruction is decoded to activate one line of the reset lines 140. This will activate a corresponding gate 141 to gate into the corresponding register 70, 71, etc. the data, all zeros at this time, on the bus out 38 to effectively reset the register, including the register full circuit, to zero.

SUMMARY OF THE INVENTION

The above described priority structure is particularly effective for large communications systems and acts to service the communications lines in accordance with their priorities. The lines are classified into groups with each group having its own priority for service. The line within each group are serviced on a first-come, first-served basis but all pending service requests from lines within a group will be serviced before any of the lines of a group having a lower priority are serviced. One exception to the time-of-request priority within a group can come if there are two or more service requests pending in addition to the one whose address is stored in a given priority register 70, 71, etc. In such a case, the line which is the first one scanned after the given register 70, 71, 72, or 73 is cleared of an occupying address will have its address gated into the register. This line could be later in time of service request than another pending line. Such alteration in a strict time priority scheme should have no appreciable effect on servicing of the communication lines.

While the invention has been particularly shown and described with reference to a preferred embodiment thereof, it will be understood by those skilled in the art that various changes in form and details can be made therein without departing from the scope of the invention.

What is claimed is:

1. In a data communications system of the type having a central processing unit, a plurality of communications lines of a number of different transmission characteristics and each assigned to one of several priority levels together with a communications control unit between said processing unit and said communications lines, said control unit including two storage units, a data path and control means for transferring data to and from said storage units and along said data path, said system also including a scanner base to test the condition of each communications line in a predetermined sequence to receive data from or to transmit data to the tested line, the invention comprising a cycle control system in said control unit having an interrupt mechanism of several levels, a plurality of interrupt registers in said scanner base, there being one interrupt register for each of said priority levels, means to select the one of said interrupt registers which is allocated to the priority of the communications line being scanned, means to gate into said selected interrupt register the address of a communications line being tested by said scanner base when an operation of said communications control unit is necessary to maintain data service to said line and to transmit an interrupt needed signal to said control unit, a priority circuit to transfer to said control unit during an ensuing operation of said interrupt mechanism, the communications line address stored in the highest order priority one of said registers which is occupied, and a circuit for each interrupt register to prevent storing into an occupied register, the line address of another communications line requiring service and having the same priority.

2. The invention as set out in claim 1 in which said scanner base also requests a cycle stealing interrupt operation of said interrupt mechanism at a higher interrupt priority level when any communications line being scanned has been set to indicate a need for bit service and cycle stealing control circuits to transfer the address of said communications line being scanned to said control unit independently of said priority registers.

3. A priority servicing system for a communications control unit of a communications network having a plurality of communications lines of a number of different characteristics, said control unit being controlled by a program stored in a core storage and having at least two levels of interrupt programs, said servicing system comprising a scanner base to test the status of each communications line according to a predetermined sequence for detection of a status requiring the initiation of a bit service program, said scanner base also sensing the termination of at each bit service program if a character service is needed, a plurality of priority registers one for each group of communications lines having a common characteristic, means responsive to detection of the need for initiation of a character service program to store the identification of the line requiring character service in its associated priority register and to signal a request for a lower level interrupt condition to said control unit, an address bus from said priority registers to said control unit, and gating means from each priority register to said address bus, each said gating means being activated jointly by said control unit during the processing of a lower level interrupt, by the prior storing of an address in its associated register and by a non-storage of data condition in all registers having a higher priority, and a circuit for each register to prevent entry of the address of a second communications line into an already occupied register.

4. The invention as set out in claim 3 wherein upon the detection of a need for a bit service in a scanned communications line, said scanner base activates a request to said control unit for a higher level cycle stealing interrupt operation, cycle steal control means active during said higher level interrupt operation to arrest scanning operations of said scanner base and to gate out to said address bus the address of the line for which bit service is requested, a line control word register set by data transmitted from said control unit to said scanner base during said higher level interrupt operations and means in said scanner base to modify the data in said line control word register and return said modified data to said control unit.

* * * * *